US011049136B1

(12) United States Patent
Yuan

(10) Patent No.: US 11,049,136 B1
(45) Date of Patent: Jun. 29, 2021

(54) INFERRING ATTRIBUTES ASSOCIATED WITH A NON-MERCHANT USER OF A CLASSIFIED ADVERTISING SERVICE BASED ON USER INTERACTIONS WITH AN ITEM FOR SALE POSTED BY THE NON-MERCHANT USER

(71) Applicant: Facebook, Inc., Menlo Park, CA (US)

(72) Inventor: Jian Yuan, Burlingame, CA (US)

(73) Assignee: Facebook, Inc., Menlo Park, CA (US)

( * ) Notice: Subject to any disclaimer, the term of this patent is extended or adjusted under 35 U.S.C. 154(b) by 71 days.

(21) Appl. No.: 16/420,089

(22) Filed: May 22, 2019

(51) Int. Cl.
*G06Q 30/02* (2012.01)
*G06N 20/00* (2019.01)
*G06N 5/04* (2006.01)

(52) U.S. Cl.
CPC .......... *G06Q 30/0254* (2013.01); *G06N 5/04* (2013.01); *G06N 20/00* (2019.01); *G06Q 30/0261* (2013.01)

(58) Field of Classification Search
None
See application file for complete search history.

(56) References Cited

U.S. PATENT DOCUMENTS

| 2005/0171863 | A1* | 8/2005 | Hagen | G06Q 30/0601 705/26.1 |
| 2013/0346205 | A1* | 12/2013 | Hogg | G06Q 30/0261 705/14.58 |
| 2017/0365012 | A1* | 12/2017 | Dalal | G06Q 50/01 |
| 2017/0372206 | A1* | 12/2017 | Kavadiki | G06Q 30/0201 |
| 2018/0121550 | A1* | 5/2018 | Jeon | G06Q 50/01 |
| 2018/0285774 | A1* | 10/2018 | Soni | G06N 3/084 |
| 2019/0114687 | A1* | 4/2019 | Krishnamurthy | G06F 16/9535 |
| 2019/0251476 | A1* | 8/2019 | Shiebler | G06F 17/16 |
| 2020/0107072 | A1* | 4/2020 | Lomada | G06Q 30/0201 |
| 2020/0279191 | A1* | 9/2020 | Koch | G06Q 10/067 |

OTHER PUBLICATIONS

Barkan, O. Item2Vec: Neural Item Embedding for Collaborative Filtering. Feb. 20, 2017. Version 3. Retrieved from arXiv.org. <URL: https://arxiv.org/abs/1603.04259> (Year: 2017).*

* cited by examiner

Primary Examiner — Bion A Shelden
(74) Attorney, Agent, or Firm — Fenwick & West LLP

(57) ABSTRACT

An online system receives information describing items for sale posted by non-merchant users of the online system and retrieves a first set of attributes associated with each non-merchant user. The online system also receives information describing a first set of user interactions by potential purchasing users with each item and then retrieves a machine-learning model trained to infer a second set of attributes associated with a non-merchant user of the online system, in which the model is trained based on the first set of attributes and the information describing the first set of user interactions. The online system then retrieves information describing a second set of user interactions by potential purchasing users with an item for sale posted by the non-merchant user and uses the model to infer the second set of attributes associated with the non-merchant user based on the information describing the second set of user interactions.

16 Claims, 3 Drawing Sheets

INFERRING ATTRIBUTES ASSOCIATED WITH A NON-MERCHANT USER OF A CLASSIFIED ADVERTISING SERVICE BASED ON USER INTERACTIONS WITH AN ITEM FOR SALE POSTED BY THE NON-MERCHANT USER

TECHNICAL FIELD

This disclosure relates generally to online systems, and more specifically to inferring attributes associated with a non-merchant user of an online system that provides a classified advertising service based on user interactions with an item for sale posted by the non-merchant user.

BACKGROUND

Conventionally, online systems that provide classified advertising services present content to users of the online systems based on attributes (e.g., demographic information, geographic location, interests/hobbies, etc.) associated with the users in order to provide the users with a more personalized experience. For example, if attributes associated with a user of an online system indicate that the user may have an interest in car parts (e.g., if the user is a car mechanic or if hobbies of the user include restoring cars), the online system may present content associated with car parts to the user. Online systems may receive information describing attributes associated with online system users from the users themselves and may infer additional attributes associated with the users from these attributes. For example, if a user profile of an online system user indicates that hobbies of the user include surfing, the online system may infer that the user also has an interest in swimming and may present content associated with swimming to the user. Online systems also may infer attributes associated with online system users based on actions performed by the users. For example, if an online system user clicks on content associated with electronics presented by the online system or checks-in to a physical location corresponding to an electronics store, the online system may infer that the user has an interest in electronics and may therefore present content associated with electronics to the user.

However, in some instances, online systems may inaccurately infer attributes associated with online system users. For example, suppose that a user of an online system who does not have any children is shopping for a toy for their dog. In this example, if the user views content in the online system associated with toys for children that the user mistakes for content associated with toys for dogs, the online system may inaccurately infer that the user has children. Continuing with this example, based on this inference, the online system may select content associated with children for presentation to the user (e.g., content associated with children's clothing, children's books, etc.) even though the user would be unlikely to have an interest in this content. By presenting content to online system users based on attributes associated with the users that are inaccurately inferred, user experience may be degraded.

SUMMARY

Online systems that provide classified advertising services conventionally present content to users of the online systems based on attributes associated with the users to provide the users with a more personalized experience. These attributes may be received from the users themselves and/or inferred by the online systems. However, attributes associated with online system users inferred by online systems may be inaccurate, which may result in the presentation of content that is irrelevant to the users, resulting in degradation of user experience.

To more accurately infer attributes associated with online system users, an online system that provides a classified advertising service infers attributes associated with non-merchant users of the online system who have posted items for sale in the online system based on user interactions by potential purchasing users of the online system with the items. More specifically, the online system receives information describing various items for sale posted by non-merchant users of the online system and then retrieves a first set of attributes associated with each of the non-merchant users. Information describing a first set of user interactions by potential purchasing users of the online system with each of these items is then received at the online system. The online system also retrieves a machine-learning model that is trained to infer a second set of attributes associated with a non-merchant user of the online system, in which the model is trained based on the first set of attributes and the information describing the first set of user interactions. The online system then retrieves information describing a second set of user interactions by potential purchasing users of the online system with an item for sale posted by the non-merchant user and uses the model to infer the second set of attributes associated with the non-merchant user based on the information describing the second set of user interactions. Since the model is trained using interactions with items being sold, the selling user actually at one time owned the item. As such, the model may be more accurate and reflect the true attributes of the user, as compared to models that are based simply on online interactions with digital content, which which users may have a weaker connection.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
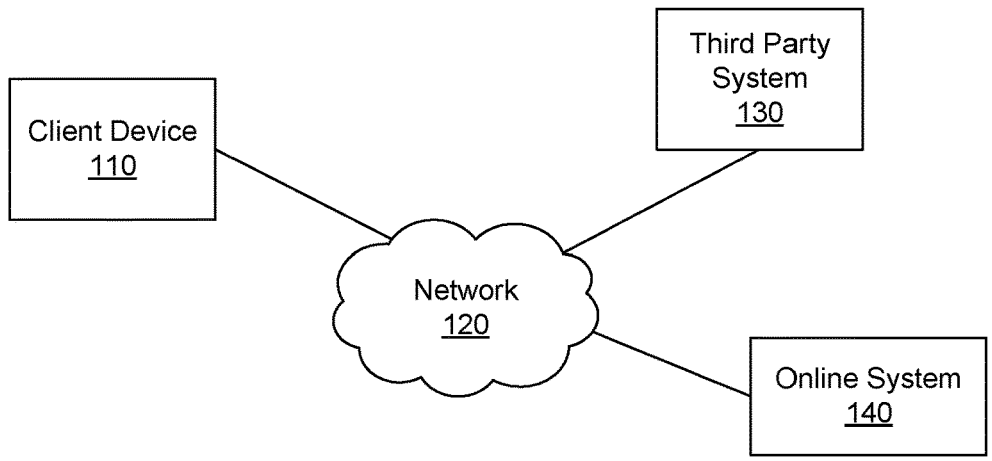
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
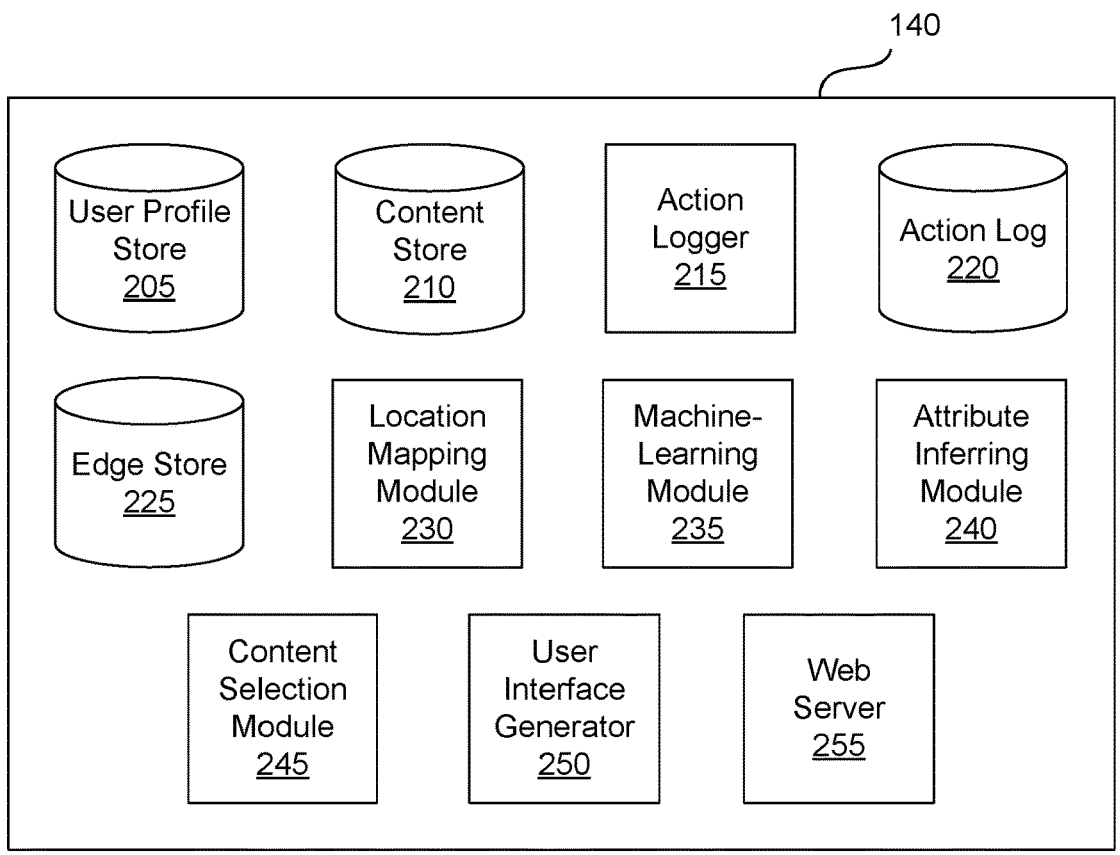
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a location mapping module 230, a machine-learning module 235, an attribute inferring module 240, a content selection module 245, a user interface generator 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

In some embodiments, information stored in the user profile store 205 may describe various geographic locations associated with users of the online system 140 and times at which the users are associated with the geographic locations. For example, suppose that a client device 110 associated with an online system user is located at a particular geographic location at a particular time. In this example, the user profile store 205 may store information identifying the user (e.g., a username) in association with information identifying the geographic location (e.g., GPS coordinates) and information describing the time (e.g., a timestamp) at which the client device 110 is located at the geographic location. In embodiments in which information stored in the user profile store 205 describes geographic locations associated with users of the online system 140 and times at which the users are associated with the geographic locations, information stored in the user profile store 205 also may describe various events occurring at the corresponding times and geographic locations. For example, if information stored in the user profile store 205 indicates that a client device 110 associated with a user of the online system 140 is located in a particular city during a particular timespan, the user profile store 205 may store this information in association with information describing an event occurring in the city during the timespan (e.g., a marathon, a convention, a concert, etc.). Geographic locations and times may be mapped to events that occur at the corresponding geographic locations and times by the location mapping module 230, which is described below.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

In embodiments in which the online system 140 provides a classified advertising service, information received at the action logger 215 may describe user interactions by potential purchasing users of the online system 140 with items for sale posted by non-merchant users of the online system 140. Examples of such user interactions include viewing the items, clicking on posts for the items, communicating with non-merchant users who posted the items, saving the items (e.g., to a wish list), adding the items to a shopping cart, placing bids for the items, expressing a preference for the items, purchasing the items, etc. In embodiments in which the action logger 215 receives information describing user interactions by potential purchasing users of the online system 140 with items for sale posted by non-merchant users of the online system 140, information describing the user interactions may be received in association with information describing the items and stored in association with this information in the action log 220. Information describing an item for sale posted by a non-merchant user of the online system 140 may describe the type of item (e.g., clothing, jewelry, electronics, furniture, etc.), the name of the item, the brand or manufacturer of the item, the model of the item, the color of the item, the size and/or dimensions of the item, the price of the item, the age and/or condition of the item, the quantity of the item available, etc.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

In embodiments in which the online system 140 provides a classified advertising service, information describing user interactions by potential purchasing users of the online system 140 with items for sale posted by non-merchant users of the online system 140 may be stored in the edge store 225. In such embodiments, this information may be stored as features included in edges between the potential purchasing users and the non-merchant users. For example, information describing the content and the frequency of communications between a potential purchasing user of the online system 140 with a non-merchant user who posted an item for sale may be stored as features included in an edge between the users. In this example, information indicating that the potential purchasing user viewed the item, clicked on a post for the item, saved the item (e.g., to a wish list), added the item to a shopping cart, placed a bid for the item, expressed a preference for the item, purchased the item, etc. also may be stored as features included in the edge between the users.

In embodiments in which information describing user interactions by potential purchasing users of the online system 140 with items for sale posted by non-merchant users of the online system 140 is stored in the edge store 225, information describing the items also may be stored in the edge store 225. In such embodiments, this information may be stored as features included in edges between the potential purchasing users and the non-merchant users. For example, if a potential purchasing user of the online system 140 interacts with an item for sale posted by a non-merchant user of the online system 140, information describing the item may be stored as features included in an edge between the potential purchasing user and the non-merchant user. As described above, information describing an item may describe the type of item, the name of the item, the brand or manufacturer of the item, the model of the item, the color of the item, the size and/or dimensions of the item, the price of the item, the age and/or condition of the item, the quantity of the item available, etc.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The location mapping module 230 may map geographic locations and times to events that occur at the corresponding geographic locations and times. In some embodiments, the location mapping module 230 may map a geographic location and one or more times to an event based on information stored in the user profile store 205, the content store 210, the action log 220, and/or the edge store 225. For example, if information stored in the user profile store 205 and the action log 220 indicates that at least a threshold percentage of users of the online system 140 who attended an event corresponding to a sporting event were located in a particular city during a particular timespan, the location mapping module 230 may map the city and the timespan to the sporting event. As an additional example, suppose that information stored in the user profile store 205 indicates that a user of the online system 140 is a music artist and that information stored in the content store 210 representing a content item indicates that the artist will be going on a tour that will stop at various geographic locations within a particular timespan. In this example, if information stored in the edge store 225 and the action log 220 indicates that at least a threshold percentage of users of the online system 140 who have established connections to the artist checked-in to a particular concert venue during a time within the timespan, the location mapping module 230 may map the geographic location of the concert venue and the time to an event corresponding to a performance by the artist. The functionality of the location mapping module 230 is further described below in conjunction with FIG. 3.

The machine-learning module 235 may train a machine-learning model to infer a set of attributes associated with a non-merchant user of the online system 140. The machine-learning model may be trained based on attributes associated with non-merchant users of the online system 140 and information describing user interactions by potential purchasing users of the online system 140 with items for sale posted by the non-merchant users. For example, suppose that the online system 140 receives information describing items for sale posted by non-merchant users of the online system 140. In this example, the machine-learning module 235 may then retrieve various attributes associated with the non-merchant users maintained in the online system 140 (e.g., in the user profile store 205, the action log 220, and/or the edge store 225). In the above example, the action logger 215 subsequently may receive information describing user interactions by potential purchasing users of the online system 140 with each of the items. Continuing with this example, the machine-learning module 235 may train a machine-learning model to infer a set of attributes associated with a non-merchant user of the online system 140, in which the model is trained based on the attributes and the information describing the user interactions. In various embodiments, the machine-learning module 235 also may train the machine-learning model based on information describing items for sale posted by non-merchant users of the online system 140 (e.g., the type of item, the name of the item, etc.).

The machine-learning model may be trained using various machine-learning techniques and/or algorithms. For example, the machine-learning model may be trained using a linear regression algorithm, a Naïve Bayes algorithm, a decision tree algorithm, etc. In some embodiments, the machine-learning model may be trained using an embedding algorithm (e.g., a word embedding algorithm) that generates an embedding corresponding to a vector representation of each item for sale posted by non-merchant users of the online system 140, such that embeddings corresponding to similar types of items are mapped near each other in vector space. In such embodiments, an embedding corresponding to an item may be generated based on information describing the item, information describing user interactions with the item, etc. For example, the machine-learning model may use an embedding algorithm to generate word embeddings corresponding to items for sale posted by non-merchant users of the online system 140 based on words included in communications between potential purchasing users of the online system 140 and the non-merchant users.

In various embodiments, the machine-learning model also or alternatively may be trained using an embedding algorithm that generates an embedding corresponding to a vector representation of each non-merchant user of the online system 140, such that embeddings corresponding to similar non-merchant users are mapped near each other in vector space. In such embodiments, an embedding corresponding to a non-merchant user may be generated based on information maintained in the online system 140 describing items for sale posted by the non-merchant user, information describing user interactions by potential purchasing users of the online system 140 with the items, and/or other attributes associated with the non-merchant user (e.g., demographic information, actions performed by the non-merchant user in the online system 140, etc.). For example, an embedding corresponding to a vector representation of a non-merchant user of the online system 140 may have a value associated with each of multiple dimensions that correspond to attributes associated with the non-merchant user and information describing items for sale posted by the non-merchant user. The functionality of the machine-learning module 235 is further described below in conjunction with FIG. 3.

The attribute inferring module 240 retrieves (e.g., as shown in steps 320 and 325 of FIG. 3) a trained machine-learning model and a set of user interactions by potential purchasing users of the online system 140 with an item for sale posted by a non-merchant user of the online system 140 and uses the model to infer (e.g., as shown in step 330 of FIG. 3) a set of attributes associated with the non-merchant user. In some embodiments, the machine-learning model may be trained by the machine-learning module 235, while in other embodiments, the machine-learning model may be trained by a third-party system 130. To use the machine-learning model to infer a set of attributes associated with a non-merchant user of the online system 140, the attribute inferring module 240 provides an input to the model that includes information describing a set of user interactions by potential purchasing users of the online system 140 with an item for sale posted by the non-merchant user, information describing the item, etc. The attribute inferring module 240 then receives an output from the model describing a set of inferred attributes associated with the non-merchant user.

In embodiments in which attributes associated with non-merchant users of the online system 140 used to train the machine-learning model include geographic locations associated with the non-merchant users, times at which the geographic locations are associated with the non-merchant users, and/or events that occurred at the corresponding geographic locations and times, attributes associated with a non-merchant user of the online system 140 inferred by the model may correspond to one or more events. For example, upon receiving information describing a set of geographic locations associated with a non-merchant user of the online system 140 and a set of times at which each of the set of geographic locations is associated with the non-merchant user, the attribute inferring module 240 provides an input to the machine-learning model describing the set of geographic locations and the set of times. In this example, the attribute inferring module 240 receives an output from the model corresponding to a set of inferred attributes associated with the non-merchant user, in which the set of inferred attributes may describe one or more events that occurred at the corresponding geographic locations and times.

In embodiments in which the machine-learning model is trained using an embedding algorithm, the model may infer a set of attributes associated with a non-merchant user of the online system 140 by generating an embedding corresponding to the non-merchant user based on an input provided to the model. For example, if the attribute inferring module 240 provides an input to the machine-learning model describing various items for sale posted by a non-merchant user of the online system 140 and a set of user interactions by potential purchasing users of the online system 140 with each item, the model may generate an embedding corresponding to a vector representation of the non-merchant user based on the input. In this example, the model compares the embedding to embeddings corresponding to vector representations of other non-merchant users of the online system 140 who have posted items for sale and identifies attributes associated with non-merchant users corresponding to embeddings within a threshold distance of the embedding corresponding to the non-merchant user. Continuing with this example, the attribute inferring module 240 then receives an output from the model describing inferred attributes associated with the non-merchant user that correspond to the attributes identified by the model. Alternatively, in the above example, if the input provided to the machine-learning model describes a set of geographic locations associated with the non-merchant user and a set of times at which each of the geographic locations is associated with the non-merchant user, the embedding corresponding to the vector representation of the non-merchant user may be generated based on the input. In this example, the embeddings to which this embedding is compared also may be generated based on geographic locations associated with the other non-merchant users and times at which the geographic locations are associated with the other non-merchant users.

In embodiments in which the machine-learning model is trained using an embedding algorithm, the model also or alternatively may infer a set of attributes associated with a non-merchant user of the online system 140 by generating an embedding corresponding to an item for sale posted by the non-merchant user based on an input provided to the model. For example, if the attribute inferring module 240 provides an input to the machine-learning model describing an item for sale posted by a non-merchant user of the online system 140 and a set of user interactions by potential purchasing users of the online system 140 with the item, the model may generate an embedding corresponding to a vector representation of the item based on the input. In this example, the model compares the embedding to embeddings corresponding to vector representations of items for sale posted by other non-merchant users of the online system 140 and identifies attributes associated with non-merchant users who have posted items for sale corresponding to embeddings within a threshold distance of the embedding corresponding to the item. Continuing with this example, the attribute inferring module 240 then receives an output from the model describing inferred attributes associated with the non-merchant user that correspond to the attributes identified by the model. The functionality of the attribute inferring module 240 is further described below in conjunction with FIGS. 3 and 4.

The content selection module 245 may identify (e.g., as shown in step 340 of FIG. 3) one or more candidate content items eligible for presentation to a viewing user of the online system 140. Candidate content items eligible for presentation to the viewing user are retrieved from the content store 210 or from another source by the content selection module 245, which may rank the candidate content items and select (e.g., as shown in step 345 of FIG. 3) one or more of the candidate content items for presentation to the viewing user. A candidate content item eligible for presentation to a viewing user is a content item associated with at least a threshold number of targeting criteria satisfied by characteristics of the viewing user or is a content item that is not associated with targeting criteria. In various embodiments, the content selection module 245 includes candidate content items eligible for presentation to a viewing user in one or more content selection processes, which identify a set of content items for presentation to the viewing user. For example, the content selection module 245 determines measures of relevance of various candidate content items to a viewing user based on characteristics associated with the viewing user by the online system 140 and based on the viewing user's affinity for different candidate content items. Based on the measures of relevance, the content selection module 245 selects content items for presentation to the viewing user. As an additional example, the content selection module 245 selects content items having the highest measures of relevance or having at least a threshold measure of relevance for presentation to a viewing user. Alternatively, the content selection module 245 ranks candidate content items based on their associated measures of relevance and selects content items having the highest positions in the ranking or having at least a threshold position in the ranking for presentation to a viewing user.

Content items selected for presentation to a viewing user may be associated with bid amounts. The content selection module 245 may use the bid amounts associated with candidate content items when selecting content for presentation to the viewing user. In various embodiments, the content selection module 245 determines an expected value associated with various candidate content items based on their bid amounts and selects content items associated with a maximum expected value or associated with at least a threshold expected value for presentation to a viewing user. An expected value associated with a candidate content item represents an expected amount of compensation to the online system 140 for presenting the candidate content item. For example, the expected value associated with a candidate content item is a product of the candidate content item's bid amount and a likelihood of a viewing user interacting with content from the candidate content item. The content selection module 245 may rank candidate content items based on their associated bid amounts and select content items having at least a threshold position in the ranking for presentation to a viewing user. In some embodiments, the content selection module 245 ranks both candidate content items not associated with bid amounts and candidate content items associated with bid amounts in a unified ranking based on bid amounts and measures of relevance associated with the candidate content items. Based on the unified ranking, the content selection module 245 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 245 receives a request to present a feed of content to a viewing user of the online system 140. The feed may include one or more advertisements as well as other content items, such as stories describing actions associated with other online system users connected to the viewing user. The content selection module 245 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 245 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 245 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the content selection module 245 presents content to a viewing user through a newsfeed including a plurality of content items selected for presentation to the viewing user. One or more advertisements also may be included in the feed. The content selection module 245 may also determine the order in which selected content items are presented via the feed. For example, the content selection module 245 orders content items in a feed based on likelihoods of a viewing user interacting with various content items. The functionality of the content selection module 245 is further described below in conjunction with FIG. 3.

Once the content selection module 245 has selected one or more content items for presentation to a viewing user of the online system 140, the user interface generator 250 may generate a user interface including the content item(s). For example, the user interface generator 250 may generate a feed of content items (e.g., a newsfeed) that includes one or more content items selected by the content selection module 245, which the online system 140 sends (e.g., as shown in step 350 of FIG. 3) for display to a viewing user of the online system 140. As an additional example, the user interface generator 250 may generate a display unit including a content item that is presented along the right side of a display area of a client device 110 associated with a viewing user of the online system 140. The functionality of the user interface generator 250 is further described below in conjunction with FIG. 3.

The web server 255 links the online system 140 via the network 120 to the one or more client devices 110, as well as to the one or more third-party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Figure 3:
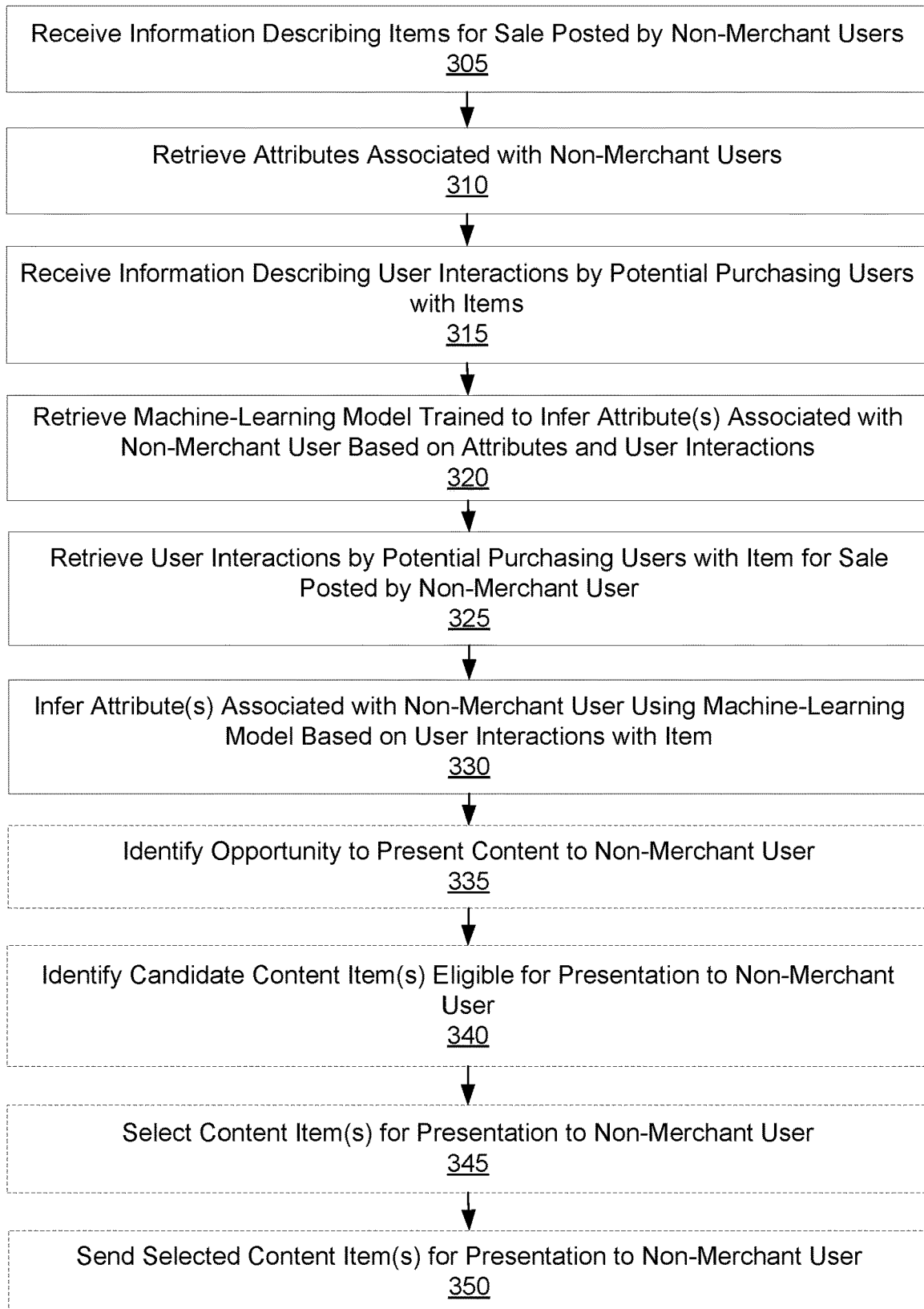
FIG. 3 is a flow chart of a method for inferring attributes associated with a non-merchant user of a classified advertising service based on user interactions with an item for sale posted by the non-merchant user, in accordance with an embodiment.

Inferring Attributes Associated with a Non-Merchant User of a Classified Advertising Service Based on User Interactions with an Item for Sale Posted by the Non-Merchant User FIG. 3 is a flow chart of a method for inferring attributes associated with a non-merchant user of a classified advertising service based on user interactions with an item for sale posted by the non-merchant user. In other embodiments, the method may include different and/or additional steps than those shown in FIG. 3. Additionally, steps of the method may be performed in a different order than the order described in conjunction with FIG. 3.

The online system 140 receives 305 information describing various items for sale posted by non-merchant users of the online system 140, in which the online system 140 provides a classified advertising service. For example, the online system 140 may receive 305 information describing an item for sale posted by a non-merchant user of the online system 140 in conjunction with receiving a request from the non-merchant user to create the post. Information describing an item for sale may include information describing the type of item (e.g., clothing, jewelry, electronics, furniture, etc.), the name of the item, the brand or manufacturer of the item, the model of the item, the color of the item, the size and/or dimensions of the item, the price of the item, the age and/or condition of the item, the quantity of the item available, or any other suitable types of information. The online system 140 may receive 305 the information in association with information identifying the non-merchant users (e.g., usernames, email addresses, or any other unique user-identifying information associated with the non-merchant users). In alternative embodiments, the online system 140 may retrieve the information describing the items for sale posted by non-merchant users and/or the information identifying the non-merchant users (e.g., from the action log 220 and/or the edge store 225).

The online system 140 then retrieves 310 a set of attributes associated with each of the non-merchant users (e.g., from the user profile store 205, the action log 220, and/or the edge store 225). Examples of attributes associated with a non-merchant user of the online system 140 include demographic information associated with the non-merchant user (e.g., age, gender, etc.), information describing actions previously performed by the non-merchant user, information describing connections established between the non-merchant user and other users of the online system 140, and any other suitable types of information describing characteristics of the non-merchant user. In some embodiments, a set of attributes associated with a non-merchant user of the online system 140 may describe one or more geographic locations associated with the non-merchant user, one or more times at which the non-merchant user is associated with each geographic location, and/or one or more events occurring at the corresponding geographic location(s) and time(s). In such embodiments, the geographic location(s) and time(s) may be mapped to the event(s) by the online system 140 (e.g., using the location mapping module 230). The online system 140 may retrieve 310 the attributes based on information identifying the non-merchant users received 305 in association with the information describing items for sale posted by the non-merchant users.

The online system 140 then receives 315 (e.g., using the action logger 215) information describing user interactions by potential purchasing users of the online system 140 with the items for sale posted by the non-merchant users. As described above, examples of such user interactions include viewing the items, clicking on posts for the items, communicating with non-merchant users who posted the items, saving the items (e.g., to a wish list), adding the items to a shopping cart, placing bids for the items, expressing a preference for the items, purchasing the items, etc. In alternative embodiments, the online system 140 may retrieve the information describing the user interactions (e.g., from the action log 220 and/or the edge store 225).

The online system 140 then retrieves 320 (e.g., using the attribute inferring module 240) a machine-learning model trained to infer a set of attributes associated with a non-merchant user of the online system 140. The machine-learning model may be trained based on the set of attributes associated with each non-merchant user and the information describing user interactions by potential purchasing users of the online system 140 with items for sale posted by the non-merchant users. In various embodiments, the machine-learning model also may be trained based on information describing the items for sale posted by the non-merchant users of the online system 140 (e.g., the type of item, the name of the item, the brand or manufacturer of the item, etc.). The machine-learning model may be trained using various machine-learning techniques and/or algorithms, such as an embedding algorithm (e.g., a word embedding algorithm) that generates an embedding corresponding to a vector representation of each non-merchant user or of each item for sale posted by each non-merchant user (e.g., based on information describing each item, information describing user interactions with each item, etc.). In some embodiments, the machine-learning model may be trained by the online system 140 (e.g., using the machine-learning module 235), while in other embodiments, the machine-learning model may be trained by a third-party system 130.

The online system 140 then retrieves 325 (e.g., using the attribute inferring module 240) a set of user interactions by potential purchasing users of the online system 140 with an item for sale posted by a non-merchant user of the online system 140 (e.g., from the action log 220 and/or the edge store 225). The online system 140 then uses the model to infer 330 a set of attributes associated with the non-merchant user by providing an input to the model that describes the set of user interactions by the potential purchasing users with the item. In embodiments in which attributes associated with non-merchant users of the online system 140 used to train the machine-learning model include geographic locations, times at which the geographic locations are associated with the non-merchant users, and/or events that occurred at the corresponding geographic locations and times, attributes associated with the non-merchant user inferred 330 by the model may correspond to one or more events.

Figure 4:
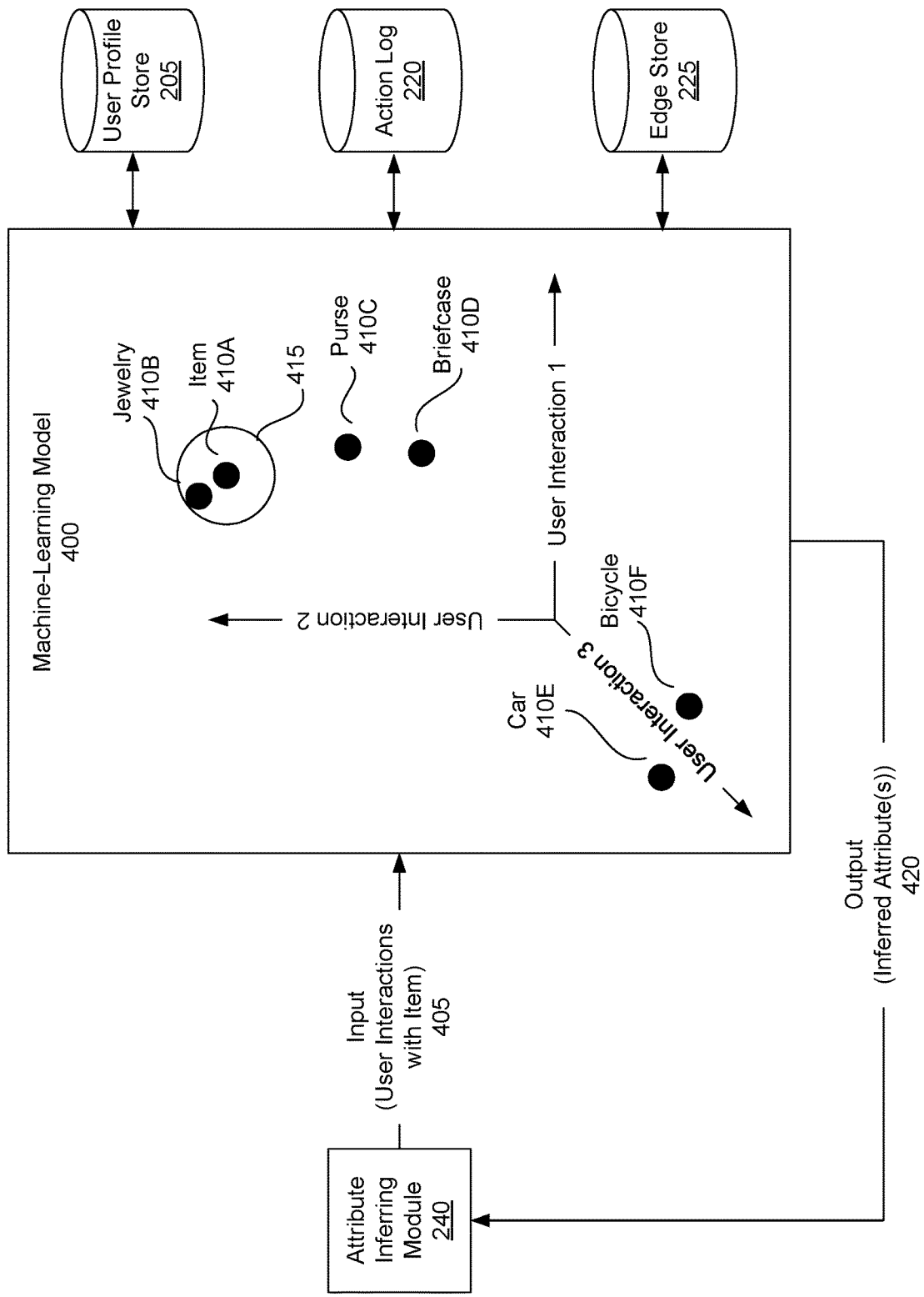
FIG. 4 is a conceptual diagram of inferring attributes associated with a non-merchant user of a classified advertising service based on user interactions with an item for sale posted by the non-merchant user, in accordance with an embodiment.

In embodiments in which the machine-learning model is trained using an embedding algorithm, the model may infer 330 the set of attributes associated with the non-merchant user by generating an embedding corresponding to the non-merchant user or the item for sale posted by the non-merchant user. For example, as shown in FIG. 4, the online system 140 provides an input 405 to the machine-learning model 400 describing a set of user interactions by potential purchasing users of the online system 140 with an item for sale posted by a non-merchant user of the online system 140. In this example, the model 400 generates an embedding 410A corresponding to a vector representation of the item based on the input 405, in which the vector representation of the item has a value associated with each of multiple dimensions that correspond to the user interactions. In the above example, the model 400 then compares the embedding 410A to embeddings 410B-F corresponding to vector representations of items for sale posted by other non-merchant users of the online system 140 that similarly have values associated with each of multiple dimensions that correspond to the user interactions, such that embeddings 410 corresponding to similar types of items are mapped near each other in vector space. Continuing with this example, the model 400 identifies attributes associated with a non-merchant user who posted an item for sale corresponding to an embedding 410B within a threshold distance 415 of the embedding 410A corresponding to the item (e.g., from the user profile store 205, the action log 220, and/or the edge store 225). In the above example, the online system 140 then receives an output 420 from the model 400 describing inferred attributes associated with the non-merchant user that correspond to the attributes identified by the model 400. Although not illustrated in FIG. 4, the model also or alternatively may infer 330 the set of attributes associated with the non-merchant user by generating an embedding corresponding to the non-merchant user and by comparing the embedding to embeddings corresponding to other non-merchant users of the online system 140 in an analogous manner.

Referring back to FIG. 3, once the online system 140 has used the machine-learning model to infer 330 the set of attributes associated with the non-merchant user, the online system 140 subsequently may identify 335 an opportunity to present content to the non-merchant user. For example, the online system 140 may receive a request to present content to the non-merchant user from a client device 110 associated with the non-merchant user. In response to identifying 335 the opportunity to present content to the non-merchant user, based on the set of inferred attributes, the online system 140 may identify 340 (e.g., using the content selection module 245) a set of candidate content items eligible for presentation to the non-merchant user and select 345 (e.g., using the content selection module 245) one or more content items from the set of candidate content items for presentation to the non-merchant user. The online system 140 may then generate (e.g., using the user interface generator 250) a user interface including the selected content item(s) and send 350 the selected content item(s) for presentation to the non-merchant user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system that provides a classified advertising service, information describing a plurality of items for sale posted by a plurality of non-merchant users of the online system who previously owned the items posted for sale;
   retrieving a first set of attributes associated with each of the plurality of non-merchant users, where the first set of attributes comprises biographic or demographic information stored in a user profile for each of the plurality of non-merchant users;
   receiving information describing a first set of user interactions by a first set of potential purchasing users of the online system with each of the plurality of items, where the first set of potential purchasing users are different from the plurality of non-merchant users;
   retrieving a machine-learning model trained to infer a second set of attributes associated with a non-merchant user of the online system, the machine-learning model trained based at least in part on the first set of attributes and the information describing the first set of user interactions;
   retrieving information describing a second set of user interactions by a second set of potential purchasing users of the online system with an item for sale posted by a target non-merchant user, where the item for sale was previously owned by the target non-merchant user; and
   inferring, using the machine-learning model, the second set of attributes associated with the target non-merchant user based at least in part on the information describing the second set of user interactions, wherein inferring the second set of attributes associated with the target non-merchant user comprises:
   generating an embedding corresponding to each of the plurality of items posted for sale by the plurality of non-merchant users based at least in part on the information describing the first set of user interactions by the first set of potential purchasing users of the online system with each of the plurality of items,
generating an additional embedding corresponding to the item for sale posted by the target non-merchant user based at least in part on the information describing the second set of user interactions by the second set of potential purchasing users of the online system with the item,
comparing the embeddings corresponding to each of the plurality of items to the additional embedding corresponding to the item,
selecting one or more of the embeddings corresponding to each of the plurality of items that are within a threshold distance to the additional embedding corresponding to the item,
determining the inferred second set of attributes based on the attributes of other non-merchant users who posted items for sale corresponding to the selected one or more embeddings.

2. The method of claim 1, wherein the first set of user interactions comprises a first set of communications between one or more of the plurality of non-merchant users and one or more of the first set of potential purchasing users and the second set of user interactions comprises a second set of communications between the target non-merchant user and one or more of the second set of potential purchasing users.

3. The method of claim 1, wherein the first set of attributes comprises a first set of geographic locations associated with each of the plurality of non-merchant users, a first set of times at which each of the first set of geographic locations is associated with each of the plurality of non-merchant users, and a first set of events occurring at each of the first set of times at which each of the first set of geographic locations is associated with each of the plurality of non-merchant users.

4. The method of claim 3, further comprising:
receiving information describing a second set of geographic locations associated with the target non-merchant user and a second set of times at which each of the second set of geographic locations is associated with the non-merchant user.

5. The method of claim 4, wherein inferring the second set of attributes associated with the target non-merchant user is further based at least in part on the second set of geographic locations associated with the target non-merchant user and the second set of times at which each of the second set of geographic locations is associated with the target non-merchant user.

6. The method of claim 1, wherein the machine-learning model generates an embedding corresponding to each of the plurality of non-merchant users based at least in part on one or more selected from the group consisting of: the information describing the plurality of items for sale posted by the plurality of non-merchant users of the online system, the first set of attributes associated with each of the plurality of non-merchant users, and the information describing the first set of user interactions by the first set of potential purchasing users of the online system with each of the plurality of items.

7. The method of claim 6, wherein inferring the second set of attributes associated with the non-merchant user comprises:
generating an additional embedding corresponding to the target non-merchant user based at least in part on one or more selected from the group consisting of: information describing the item for sale posted by the target non-merchant user and the information describing the second set of user interactions by the second set of potential purchasing users of the online system with the item for sale posted by the target non-merchant user;
comparing the embedding corresponding to each of the plurality of non-merchant users to the additional embedding corresponding to the target non-merchant user; and
inferring the second set of attributes associated with the target non-merchant user based at least in part on the comparing.

8. The method of claim 1, wherein the first set of user interactions comprises a first set of purchases of one or more of the plurality of items by one or more of the first set of potential purchasing users from one or more of the plurality of non-merchant users and the second set of user interactions comprises a purchase of the item by a user of the second set of potential purchasing users from the target non-merchant user.

9. A computer program product comprising a non-transitory computer readable storage medium having instructions encoded thereon that, when executed by a processor, cause the processor to:
receive, at an online system that provides a classified advertising service, information describing a plurality of items for sale posted by a plurality of non-merchant users of the online system who previously owned the items posted for sale;
retrieve a first set of attributes associated with each of the plurality of non-merchant users, where the first set of attributes comprises biographic or demographic information stored in a user profile for each of the plurality of non-merchant users:
receive information describing a first set of user interactions by a first set of potential purchasing users of the online system with each of the plurality of items, where the first set of potential purchasing users are different from the plurality of non-merchant users:
retrieve a machine-learning model trained to infer a second set of attributes associated with a non-merchant user of the online system, the machine-learning model trained based at least in part on the first set of attributes and the information describing the first set of user interactions;
retrieve information describing a second set of user interactions by a second set of potential purchasing users of the online system with an item for sale posted by a target non-merchant user, where the item for sale was previously owned by the target non-merchant user; and
infer, using the machine-learning model, the second set of attributes associated with the target non-merchant user based at least in part on the information describing the second set of user interactions, wherein inferring the second set of attributes associated with the target non-merchant user comprises:
generating an embedding corresponding to each of the plurality of items posted for sale by the plurality of non-merchant users based at least in part on the information describing the first set of user interactions by the first set of potential purchasing users of the online system with each of the plurality of items,
generating an additional embedding corresponding to the item for sale posted by the target non-merchant user based at least in part on the information describing the second set of user interactions by the second set of potential purchasing users of the online system with the item, comparing the embeddings corresponding to each of the plurality of items to the additional embedding corresponding to the item, selecting one or more of the embeddings corresponding to each of the plurality of items that are within a threshold distance to the additional embedding corresponding to the item, determining the inferred second set of attributes based on the attributes of other non-merchant users who posted items for sale corresponding to the selected one or more embeddings.

10. The computer program product of claim 9, wherein the first set of user interactions comprises a first set of communications between one or more of the plurality of non-merchant users and one or more of the first set of potential purchasing users and the second set of user interactions comprises a second set of communications between the target non-merchant user and one or more of the second set of potential purchasing users.

11. The computer program product of claim 9, wherein the first set of attributes comprises a first set of geographic locations associated with each of the plurality of non-merchant users, a first set of times at which each of the first set of geographic locations is associated with each of the plurality of non-merchant users, and a first set of events occurring at each of the first set of times at which each of the first set of geographic locations is associated with each of the plurality of non-merchant users.

12. The computer program product of claim 11, wherein the computer-readable storage medium further has instructions encoded thereon that, when executed by the processor, cause the processor to:

receive information describing a second set of geographic locations associated with the target non-merchant user and a second set of times at which each of the second set of geographic locations is associated with the non-merchant user.

13. The computer program product of claim 12, wherein infer the second set of attributes associated with the target non-merchant user is further based at least in part on the second set of geographic locations associated with the target non-merchant user and the second set of times at which each of the second set of geographic locations is associated with the target non-merchant user.

14. The computer program product of claim 9, wherein the machine-learning model generates an embedding corresponding to each of the plurality of non-merchant users based at least in part on one or more selected from the group consisting of: the information describing the plurality of items for sale posted by the plurality of non-merchant users of the online system, the first set of attributes associated with each of the plurality of non-merchant users, and the information describing the first set of user interactions by the first set of potential purchasing users of the online system with each of the plurality of items.

15. The computer program product of claim 14, wherein infer the second set of attributes associated with the non-merchant user comprises:

generate an additional embedding corresponding to the target non-merchant user based at least in part on one or more selected from the group consisting of: information describing the item for sale posted by the target non-merchant user and the information describing the second set of user interactions by the second set of potential purchasing users of the online system with the item for sale posted by the target non-merchant user;

compare the embedding corresponding to each of the plurality of non-merchant users to the additional embedding corresponding to the target non-merchant user; and infer the second set of attributes associated with the target non-merchant user based at least in part on the comparing.

16. The computer program product of claim 9, wherein the first set of user interactions comprises a first set of purchases of one or more of the plurality of items by one or more of the first set of potential purchasing users from one or more of the plurality of non-merchant users and the second set of user interactions comprises a purchase of the item by a user of the second set of potential purchasing users from the target non-merchant user.

* * * * *